April 10, 1956 W. HAYES 2,741,212
CAM-SETTING DEVICE
Filed Nov. 13, 1950
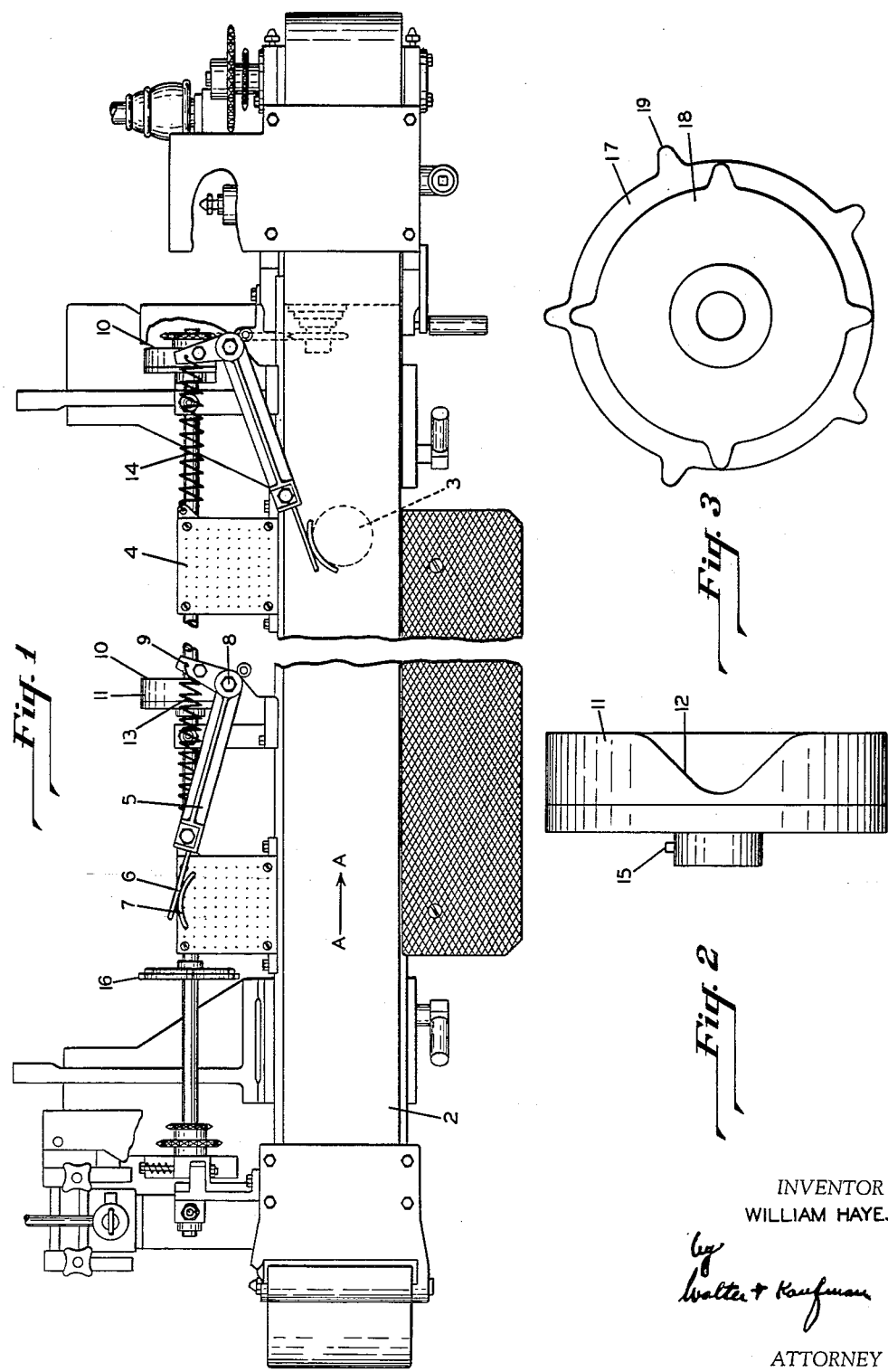
INVENTOR
WILLIAM HAYES
ATTORNEY

United States Patent Office 2,741,212
Patented Apr. 10, 1956

2,741,212
CAM-SETTING DEVICE

William Hayes, Millville, N. J., assignor to Armstrong Cork Company, Lancaster, Pa., a corporation of Pennsylvania Application November 13, 1950, Serial No. 195,335

2 Claims. (Cl. 116—124)

This invention relates to a cam-setting device and more particularly to a device for setting the cams controlling the push-out arms on glass container machines, such as the conventional I. S. machines.

In the production of glassware on conventional glass-making machinery, it is essential that the push-out devices are properly timed to place the glassware on the conveyor leading away from the machine at properly spaced intervals so that the glassware will be delivered to the end of the conveyor in synchronism with the take-out or transfer device which transfers the glassware from the conveyor to the lehr.

When changing the machine from the manufacture of one size of glassware to a different size, it is usually necessary to change the spacing of the glassware on the conveyor in order that the take-out device can properly place the glassware in the lehr. In order to change the spacing of the glassware on the conveyor, it is necessary to change the firing order of the various stations of the machine. It will be understood that when the firing order is changed, the order of operating the push-out device must be changed accordingly so that the articles will be transferred to the conveyor at the proper time.

When the order of operating the push-outs is changed, it is necessary for the cams which actuate the push-out devices to be realigned on the shaft. In the past this has always been done by guesswork. In five-section machines it sometimes required several hours to get the cams properly adjusted so that the glassware would be correctly spaced on the conveyor. In order to overcome this difficulty, I have developed a cam-adjusting device which is mounted on the shaft with the push-out cams so that the cams may be lined up without adjusting devices, thereby insuring the proper alignment of the cams before the machine is started in operation.

An object of this invention is to provide a cam-adjusting device so that the cams may be properly aligned when changing from one firing order to another in the operation of an I. S. glass-making machine.

In order that my invention may be more readily understood, it will be described in connection with the attached drawing, in which Figure 1 is a top plan view of the conveyor mechanism of the conventional I. S. machine;

Figure 2 is an elevational view of one of the cams used to actuate the push-out device; and Figure 3 is a plan view of the cam-adjusting device.

Referring to Figure 1, there is shown a conveyor 2 for moving the glassware 3 away from the I. S. machine to the next machine in the processing line, which is generally a lehr. The conveyor operates in the direction of the arrow A—A. As the glassware is removed from the mold in which it is blown (not shown), it is placed on the grid 4 and is removed from the grid 4 to the belt 2 by means of the push-out arm 5, carrying an extension 6 to which is attached a curved or other suitably shaped element 7 for engagement with the glassware to move it from the grid 4 on to the conveyor 2. The push-out arm 5 pivots about a pivot point 8 and has an extension 9, disposed at an angle of approximately 90° to the arm 5, which carries a small cam roller adapted to operate on the cam surface 10 of the cylindrical cam 11. A large view of the cylindrical cam is shown in Figure 2. This cam has a cam track which is flat over more than half of the circumference of the cam and has a sharp indentation 12 into which the cam roller falls during a portion of the rotation of the cylindrical cam 11. When the cam roller reaches the portion 12 of the cam surface, the roller is urged along the curved portion of the cam track by means of a spring 13, one end of which is attached to the extension 9 and the other end of which is attached to the grid 4. This spring pulls the extension 9, pivoting the arm 5 about pivot point 8, forcing the arm 5 and the glassware-engaging member 7 toward the conveyor, thereby pushing the glassware 3 from the grid 4 on to the conveyor 2.

The cylindrical cams 11 are all mounted on a common shaft 14, which extends the entire length of the machine immediately under the grids 4. The cams 11 are clamped on the shaft 14 by means of bolts 15 passing through the split hub of the cam 11, which affix the cams to the shaft for rotation therewith. When the firing order of the I. S. machine is changed, it is necessary to change the setting of the cams with respect to the shaft 14. In order to accomplish this operation with a minimum of trouble, I have devised a set-up gauge 16 which is mounted on the shaft 14 for rotation therewith in such position that it is visible to a workman working at any of the cams 11. The gauge 16 is made of two concentric plates, 17 and 18, the larger of the two, plate 17, having five equally spaced points 19. The smaller concentric plate 18 has four equally spaced points. The five-pointed plate 17 is used for aligning the cams for a five-section machine, while the four-pointed plate 18 is used for aligning the cams of a four-section machine.

When adjusting the cams, the shaft 14 is rotated until one of the points 19 is disposed in an upward direction. When the point 19 is at this location, the bolts 15 are loosened, permitting free movement of the cam 11 controlling the push-out arm 5 for the station which is to be the first to fire in the firing order. The cam is rotated freely on the shaft until the cam recess 12 is at the top of the shaft 14 in alignment with the point 19 on the indicator plate 16. With the cam recess 12 in this position the bolts 15 are tightened, securely affixing the cam to the shaft. After this has been done, the same operation is performed on the cam for the next station to be fired in the firing order. However, before number two station cam is adjusted, the shaft 14 is rotated through one-fifth of a revolution (in the case of the five-station machine), or until the second point 19 of the indicator 16 is disposed in an upward direction. After this is done, the cam for number two station is properly adjusted. This operation is continued until all five of the cams are properly adjusted.

In the operation of this device, the following procedure is followed in changing the firing order. On a five-station right-hand delivery machine as shown in the drawing a conveyor spacing of 5¼" between articles requires a firing order of 5-3-1-4-2. Inasmuch as the stations are numbered from left to right, this firing order would mean that number five push-out is the first to operate, followed by number three, not shown on the drawing, followed by number one, which is the one shown at the left of the drawing, and then number four and number 2 (not shown on the drawing). In changing from this setting to the proper setting for a 10½" interval, the firing order must be changed to 1-3-5-2-4. In order to do this, the shaft 14 is rotated until one of the points 19 of the five-pointed plate 17 is disposed in an upward direction. When this is done, the cylindrical cam 11 controlling the push-out arm 5 for number one grid 4 is adjusted with the cam recess 12 in line with the uppermost point of the plate 17. When the cam is so aligned the bolts 15 are tightened so that the cam will rotate with the shaft 14. After this is accomplished, the shaft is rotated one-fifth of a turn in its normal direction of operation until the next point is in an upward direction. With the shaft so positioned, the cam for number three station is loosened and rotated freely on the shaft until the cam recess 12 is in line with the point on the plate 17. This operation is continued for all five stations, and the machine can then be operated with the correct interval of 10½" between glassware on the conveyor.

The mechanism required for changing the firing order of the different sections on the I. S. machine does not form a part of this invention and will, therefore, not be described in this application.

The above description has been given in connection with a five-station machine. The same process is used in adjusting the cams on four-station machines; however, the four-point plate is used for adjusting these stations.

It will be clear from the above that I have developed a relatively simple cam-setting device which enables the mechanic to very easily and quickly adjust cams to maintain the proper interval between the articles passing down the conveyor from the conventional glass-making machinery.

I claim:

1. In a device of the type described, the elements comprising a rotatable shaft; a plurality of cams adjustably mounted on said shaft for angular adjustment with respect to the shaft; a cam-adjusting indicator fixedly mounted on said shaft for rotation therewith, said indicator comprising a plurality of indicator points disposed angularly about said shaft, the number of indicator points corresponding to the number of cams mounted on said shaft, each of said cams being provided with a predetermined point for alignment with one of said indicator points; and means for affixing said cam to said shaft, with the predetermined point thereon in alignment with said indicator.

2. In a device of the type described, the elements comprising a rotatable shaft; a plurality of cams mounted on said shaft for angular adjustment with respect to the shaft; a cam-adjusting indicator fixedly mounted on said shaft for rotation therewith, each of said cams being provided with a predetermined point for alignment with said indicator; and means for affixing said cams to said shaft, with the predetermined point thereon in alignment with said indicator.

References Cited in the file of this patent

UNITED STATES PATENTS

| | | |
|---|---|---|
| 1,361,676 | Brewer | Dec. 7, 1920 |
| 1,846,289 | Vasselli | Feb. 23, 1932 |
| 1,975,322 | Ives | Oct. 2, 1934 |
| 2,163,343 | Leishman | June 20, 1939 |
| 2,246,208 | Hobbs | June 17, 1941 |
| 2,419,222 | Lamback | Apr. 22, 1947 |
| 2,554,545 | Winder | May 29, 1951 |